US006852930B1

United States Patent
Babiarz et al.

(10) Patent No.: US 6,852,930 B1
(45) Date of Patent: Feb. 8, 2005

(54) SEAL FOR CABLES AND CONDUITS

(75) Inventors: Paul S. Babiarz, Liverpool, NY (US); Darren Loraas, Calgary (CA); Hans Haselbacher, Clay, NY (US)

(73) Assignee: Cooper Industries, Inc., Houston, TX (US)

( * ) Notice: Subject to any disclaimer, the term of this patent is extended or adjusted under 35 U.S.C. 154(b) by 0 days.

(21) Appl. No.: 10/695,651

(22) Filed: Oct. 29, 2003

(51) Int. Cl.$^7$ ................................................ H02G 3/00
(52) U.S. Cl. ................. 174/100; 174/68.1; 174/65 R; 174/101; 248/56
(58) Field of Search .................. 174/100, 68.3, 174/68.1, 48, 65 R, 101; 211/26; 248/56

(56) References Cited

U.S. PATENT DOCUMENTS 4,287,386 A * 9/1981 Scahill et al. .................. 174/76
5,557,073 A * 9/1996 Truesdale et al. ............ 174/151
5,668,351 A * 9/1997 Hanlon et al. ............. 174/68.3
6,329,599 B1 * 12/2001 Zimmerman ............... 174/68.3

* cited by examiner

Primary Examiner—Dhiru R. Patel
(74) Attorney, Agent, or Firm—Fish & Richardson P.C.

(57) ABSTRACT

Electrical conduits and conductors are sealed using a chamber that is configured for attachment to a conduit through which at least one conductor runs, such that the at least one conductor also runs through the chamber. A port permits access to the chamber to inject a sealing compound into the chamber, and a vent permits access to a portion of the conductor that is located between portions of the conductor that are surrounded by the sealing compound after the sealing compound is injected into the chamber.

17 Claims, 5 Drawing Sheets

SEAL FOR CABLES AND CONDUITS

TECHNICAL FIELD

This document relates to a seal for cables and conduits.

BACKGROUND

A seal is typically used to prevent harmful fluids and vapors in a process area from entering an electrical conduit that may leave the process area. If the seal fails, the harmful vapors may enter the electrical conduit and travel down the conduit to an unprotected location. The vapors may ignite in the unprotected location due to arcing or sparking.

SUMMARY

In one general aspect, electrical conduits and conductors may be sealed using a chamber configured for attachment to a conduit through which at least one conductor runs, such that the conductor also runs through the chamber. A port permits access to the chamber to inject a sealing compound into the chamber, and a vent permits access to a portion of the conductor that is located between portions of the conductor that are surrounded by the sealing compound after the sealing compound is injected into the chamber.

Implementations may include one or more of the following features. For example, a pressure gauge that monitors the pressure within the chamber may be attached to the vent or placed inside the vent. An explosion-proof drain that vents vapors from within the chamber may be attached to the vent. The vent may be blocked with a plug.

The chamber may include a base and a cover that may be threaded to screw onto the base. The port may be located in the cover.

The vent may include a tube that separates the portions of the conductor that are surrounded by the sealing compound from the portion of the conductor that is accessible through the vent. The conductor may run perpendicularly across the tube. The tube may include two interlocking halves between which the conductor is placed, and may be made of plastic.

The sealing compound may be a two-part mixture that expands after mixing and injection into the chamber.

In another general aspect, sealing electrical conduits and conductors includes attaching a chamber to a conduit through which at least one conductor runs. A tube that opens to the outside of the chamber is mounted within the chamber, and the conductor is threaded though the chamber and through the tube. The chamber is covered with a cover.

Implementations may include one or more of the following features. For example, a plug or a pressure gauge may be placed over an end of the tube on the outside of the chamber. A pressure gauge also may be inserted into the tube and a plug may be placed over an end of the tube on the outside of the chamber.

Mounting the tube in the chamber may include mounting a bottom half of the tube in the chamber, passing the conductor across the bottom half of the tube, and mounting a top half of the tube in the chamber over the conductor and the bottom half of the tube.

A sealing compound also may fill the chamber to form an explosion-proof seal in the chamber.

The chamber may be covered with the cover by screwing the cover onto the chamber.

The sealing compound may be injected into the chamber through a nozzle in the cover. A plug may be placed over the nozzle before allowing the sealing compound to expand and harden.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

A seal may be used to prevent migration of harmful fluids and vapors down an electrical conduit. The conductors within the seal are separated by an expanding sealing compound that blocks movement of the vapors. The seal may also include a vent though which the vapors can exit the seal and a pressure gauge that monitors the pressure of the vapors within the seal.

Figure 1:
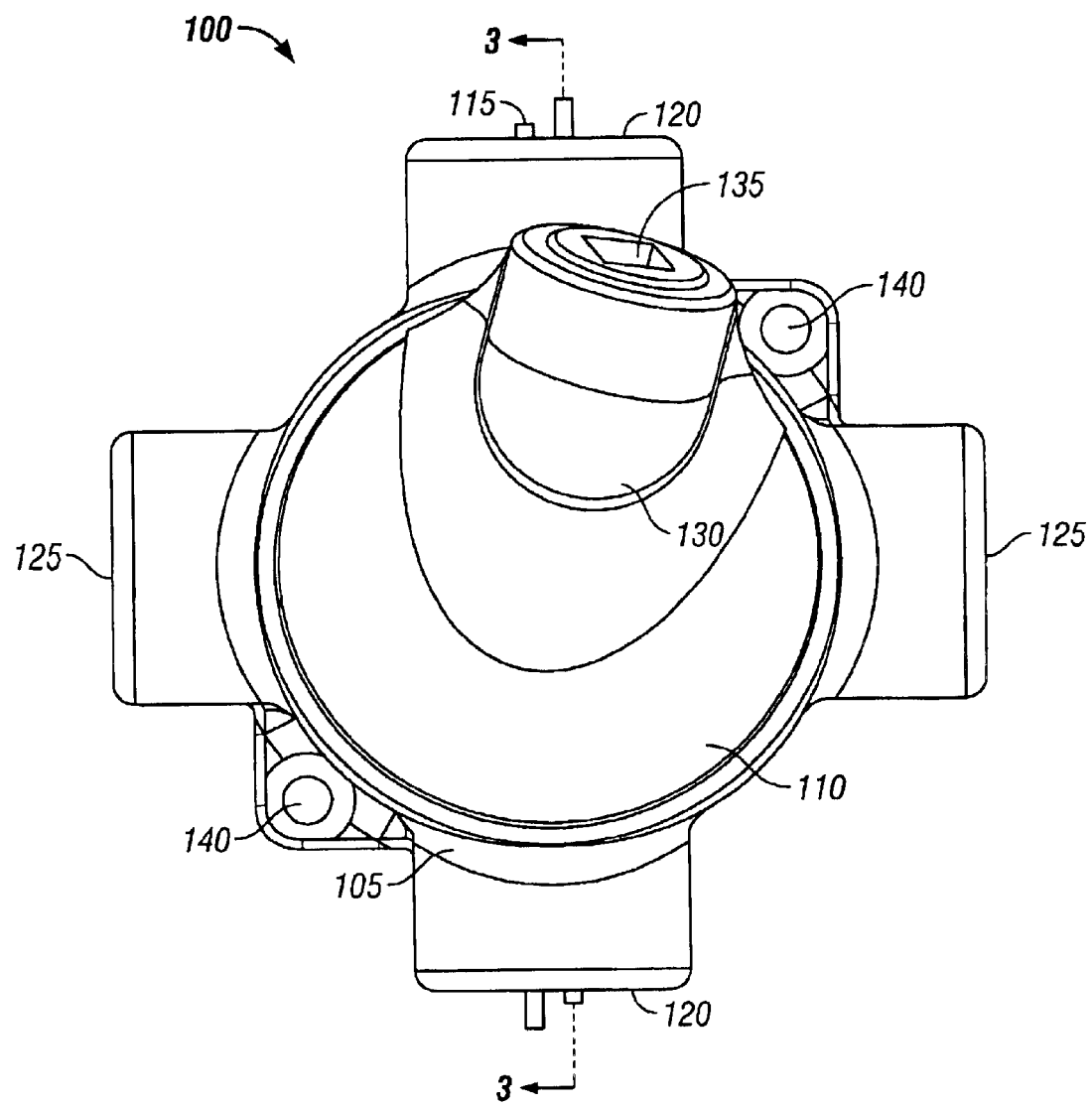
FIG. 1 is a schematic diagram of a seal.

Referring to FIG. 1, a seal 100 includes a base 105 and a cover 110 that may screw onto the base 105. The base 105 and the cover 110 may be made out of iron, aluminum, or any other suitable material. Conductors 115 run through the base 105 of the seal 100. The conductors 115 enter and exit the base 105 through two conduit attachment points 120 that are located on opposite sides of the seal 100. The conduit attachment points 120 are threaded so that an electrical conduit containing the conductors 115 can be screwed into the base 105. The conduit attachment points 120 provide access to the center of the base 105 until a sealing compound is placed in the base 105.

The seal 100 may be used as a standalone, or primary, conduit seal or as a backup, or secondary, seal to a primary conduit seal. When the seal 100 is used as a secondary seal, conduits may be attached to each of the conduit attachment points 120. When the seal 100 is used as a primary seal, a conduit may be attached to one of the conduit attachment points 120, while the other conduit attachment point 120 is directly connected to a process area. For ease of discussion, the following description assumes that the seal 100 is being used as a secondary seal.

Two venting points 125 provide access to the center of the base 105 even after the sealing compound has been placed in the base 105. As illustrated below with reference to FIG. 2, a tube connecting the two venting points 125 is perpendicular to a line extending between the two conduit attachment points 120. The venting points 125 may be blocked with plugs to prevent fluids and vapors from exiting the seal 100. In addition, a pressure gauge may be attached to one of the venting points 125 to measure the pressure within the seal 100. The pressure gauge also may be positioned entirely within the tube, and may be accessed through conductors that extend out of one of the conduit attachment points 120. An explosion proof drain, breather, or rupture disk also may be attached to the venting points 125.

A nozzle 130 extends from the top of the cover 110 and permits access to the center of the base 105 through an access port 135. The access port 135 and the nozzle 130 are used to inject the sealing compound into the base 105. The access port 135 may be blocked with a plug (not shown) to prevent access to the inside of the seal 100 once the sealing compound has been injected into the base 105. Since the sealing compound expands upon being injected into the base 105, the plug may also serve to prevent the sealing compound from exiting the base when the sealing compound expands. The seal 100 can be attached to a surface with fasteners, such as screws, that extend through a pair of attachment points 140.

Figure 2:
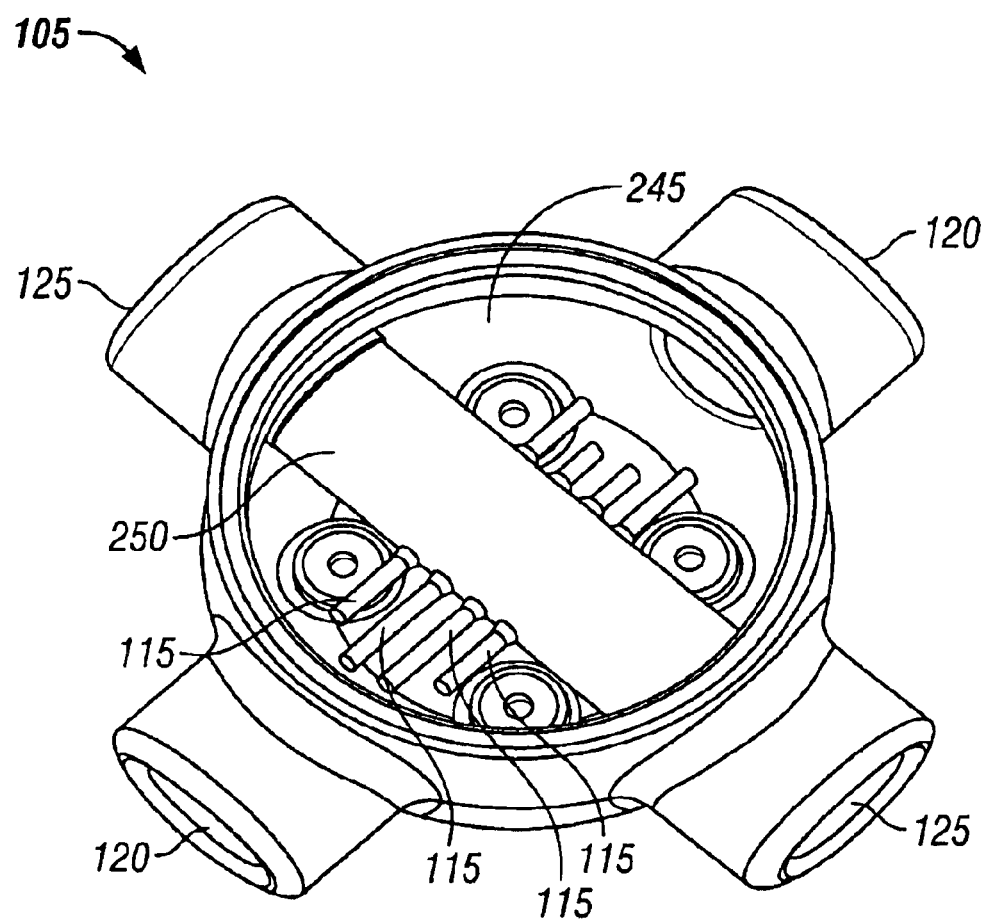
FIG. 2 is a perspective illustration of a base from the seal of FIG. 1.

Referring to FIG. 2, one implementation of the base 105 of a seal 100 may accommodate up to four conductors 115 for the purpose of sealing an electrical conduit containing those conductors from harmful vapors. The conductors 115 enter and exit the base 105 through the conduit attachment points 120, where the electrical conduits that contain the conductors 115 are attached to the base 105.

The seal 100 prevents the migration of harmful vapors from a conduit attached to one of the conduit attachment points 120 to a conduit attached to the other of the conduit attachment points 120. To this end, a sealing chamber 245 within the base 105 is filled with the sealing compound to prevent harmful vapors from entering the seal 100 at one conduit attachment point 120 and exiting at a second conduit attachment point 120.

The venting points 125 do not provide access to the sealing chamber 245. Instead, the venting points 125 attach to the opposite ends of a plastic tube 250. Any vapors or fluids that enter the seal 100 may enter the plastic tube 250. After entering the tube 250, the vapors may exit the seal 100 through the venting points 125, if the venting points 125 are not capped. If the venting points are capped, vapors entering the tube 250 may be detected using a pressure gauge positioned within or connected to the tube 250.

Figure 3:
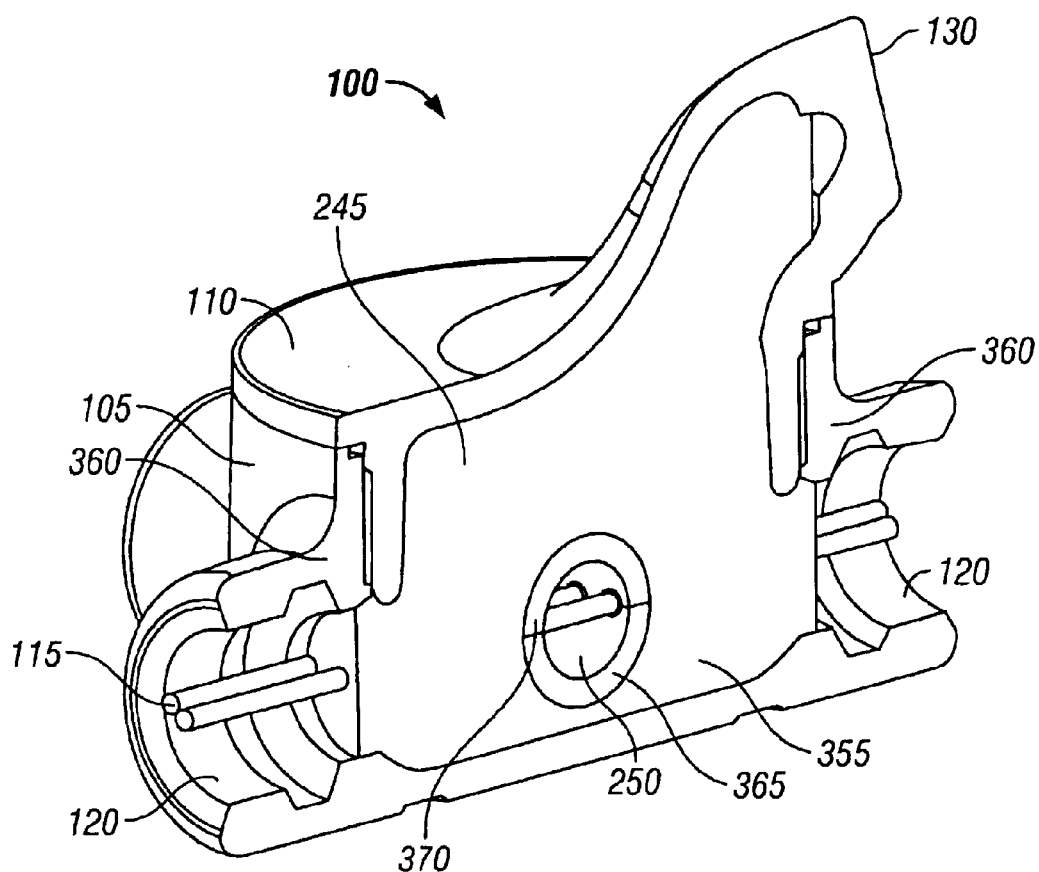
FIG. 3 is a cross section of the seal of FIG. 1 taken along section 3—3 of FIG. 1.

Referring to FIG. 3, a cross sectional view of the seal 100 taken along section 3—3 reveals the inner configuration of the seal 100. The base 105 and the cover 110 are placed together to form the chamber 245 through which the conductors 115 extend.

The nozzle 130 on the cover 110 of the seal 100 is used to inject the sealing compound 355 into the base 105. As shown, the sealing compound 355 has been allowed to expand and harden within the base 105 and the cover 110 of the secondary process seal 100. In one implementation, the sealing compound 355 is a two-part mixture that starts to expand once the two parts are mixed. The sealing compound 355 expands to approximately four times its size immediately after being mixed. As expansion occurs, the sealing compound 355 moves between the conductors 115 to prevent the conductors 115 from touching each other or the sides of the base 105. The cover 110 may be screwed onto the base 105 to hold the base 105 and the cover 110 together to confine the expanding sealing compound 355 within the sealing chamber 245. At full expansion, the sealing compound 355 extends within the base 105 approximately to the hub stops 360 at the edge of the base 105.

In one implementation, the sealing compound 355 is provided in a self-contained mixing and applying cartridge. The two parts or materials of the sealing compound 355 are separated by a barrier, such as a foil barrier, partway between a top and bottom of the cartridge. A mixing rod is coupled to a plunger within the cartridge. After the barrier between the two materials is broken, the plunger is moved up and down within the cartridge with the mixing rod to combine the two materials. After the two materials have been mixed, a nozzle is attached to the cartridge, and the mixing rod is used to force the mixed sealing compound 355 out of the cartridge through the nozzle. The nozzle is placed in the access port 135 of the nozzle 130 of the cover 110 so that the sealing compound may be injected into the base 105. A plug is quickly placed over the access port 135 of the nozzle 130 to prevent the sealing compound from expanding outside of the chamber 245.

In one implementation, the sealing compound 355 is Chem-Cast 637 sealing foam that includes Chem-Cast 637 isoocyanate and Chem-Cast 637 polyol. Isocyanate is a dark brown liquid that is insoluble in water with a boiling point of 392° F. (200° C.), a vapor density of 0.00016 (mm Hg), and a specific gravity of 1.2 g/mL. Polyol is a gray liquid, partially soluble in water with a specific gravity of 1.05 g/mL. When mixed together, the resultant material is gray in color and has a rise time of 1.5–2.5 minutes and a gel time of 4–5 minutes. When fully cured, the foam density is 15–20 b/ft$^3$. The compression strength is greater than 60 psi, the porosity is greater than 90% closed cell, and the water absorption is less than 1%.

Chem-Cast 637 is a fire resistant two-part rigid polyurethane foam that expands to form a dense, high strength foam and has excellent adhesion to many surfaces without the use of primers. The sealing compound 355 should be held between 4° C. and 29° C. The sealing compound 355 may be used in various hazardous areas, including Class I, Division 1 & 2, Groups A, B, C, D and Class I, Zones 0, 1, & 2. Chem-Cast 637 is available from Chemque, Inc. of Indianapolis, Ind.

In further implementations, the sealing compound 355 may be a single material that may start expanding at a controlled time, such as by exposure to air or other gases or by electrical stimulation, heat or any other controllable event.

Since the sealing compound 355 does not enter the plastic tube 250, the tube 250 provides a port through which any vapors that pass along a conductor 115 may escape. The tube 250 includes a lower half 365 and an upper half 370. The conductors 115 fit through openings defined between the lower half 365 and the upper half 370 of the plastic tube 250.

During assembly and installation of the seal 100, the lower half 365 is placed in the base 105 and the conductors 115 are placed across the lower half 365. The upper half 370 then is placed over the lower half 365 and the conductors 115 to form the tube 250. The cover 110 then is screwed onto the base 105 and the sealing compound 355 is injected to complete the seal 100.

Figure 4:
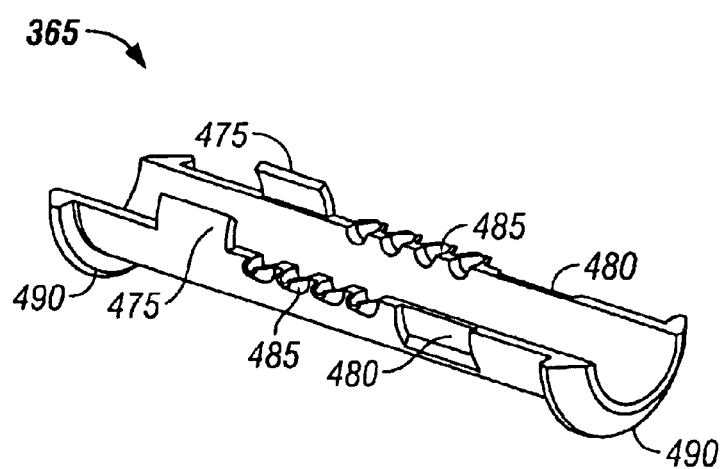
FIG. 4 is a perspective illustration of half of a plastic tube from the seal of FIG. 1.

Referring to FIG. 4, tube half 365, which is identical to tube half 370, includes a pair of teeth 475 near one end that mate with a pair of indentations 480 near the opposite end of the other tube half. A snap fit between the teeth 475 and the indentations 480 holds the two halves 365 and 370 together to form the cylindrical plastic tube 250.

Tube half 365 also includes four notches 485 on each side of the tube half between the teeth and the indentations. The notches 485 from two connected tube halves combine to form holes through which the conductors 115 pass. Each half 365 of the plastic tube 250 also includes tapered ends 490 that fit into the venting points 125. The sealing compound may not form a tight seal against the conductors. Instead, there may be a small gap between the sealing compound and the conductor through which vapors can flow. As a result, the vapors may move from the electrical conduit and into the seal 100 along the path of the conductors 115. As a result, the vapors may enter the tube 250 with the conductors through the holes formed by the notches 485 from the lower half 365 and the upper half 370 of the tube 250. The vapors exit the tube 250 through the venting points 125 rather than the holes formed by the notches 485 because there is less resistance to flow out of the venting points 125 than to flow through any gaps defined between the conductors and the notches 485 or sealing compound.

Figure 5:
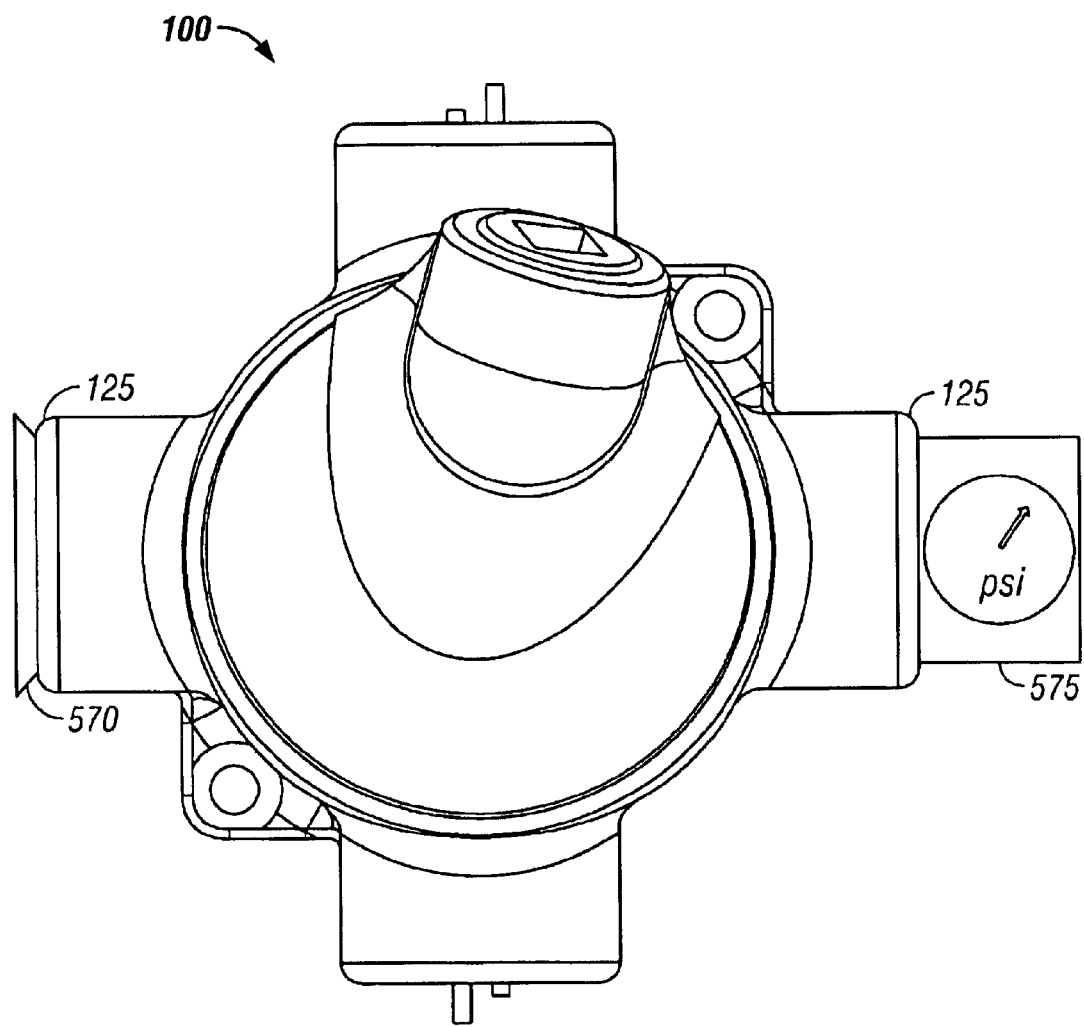
FIG. 5 is a diagram of a pressure gauge attached to the seal of FIG. 1

Referring to FIG. 5, a seal 100 may have a plug 570 or a pressure gauge 575 or an explosion-proof drain (not shown) installed in the venting points 125. When simultaneously installed in both venting points 125, the plug 570 and the pressure gauge 575 block any vapors that enter the tube 250, which connects to the venting points 125, from exiting the seal 100. The pressure gauge 575 also measures the pressure inside the seal 250. Alternatively or additionally, a pressure gauge could be installed entirely within the tube 250, and the venting points 125 could both be blocked with plugs 570. In this case, the pressure gauge 575 may be accessed through conductors that extend out of one of the conduit attachment points 120.

Figure 6:
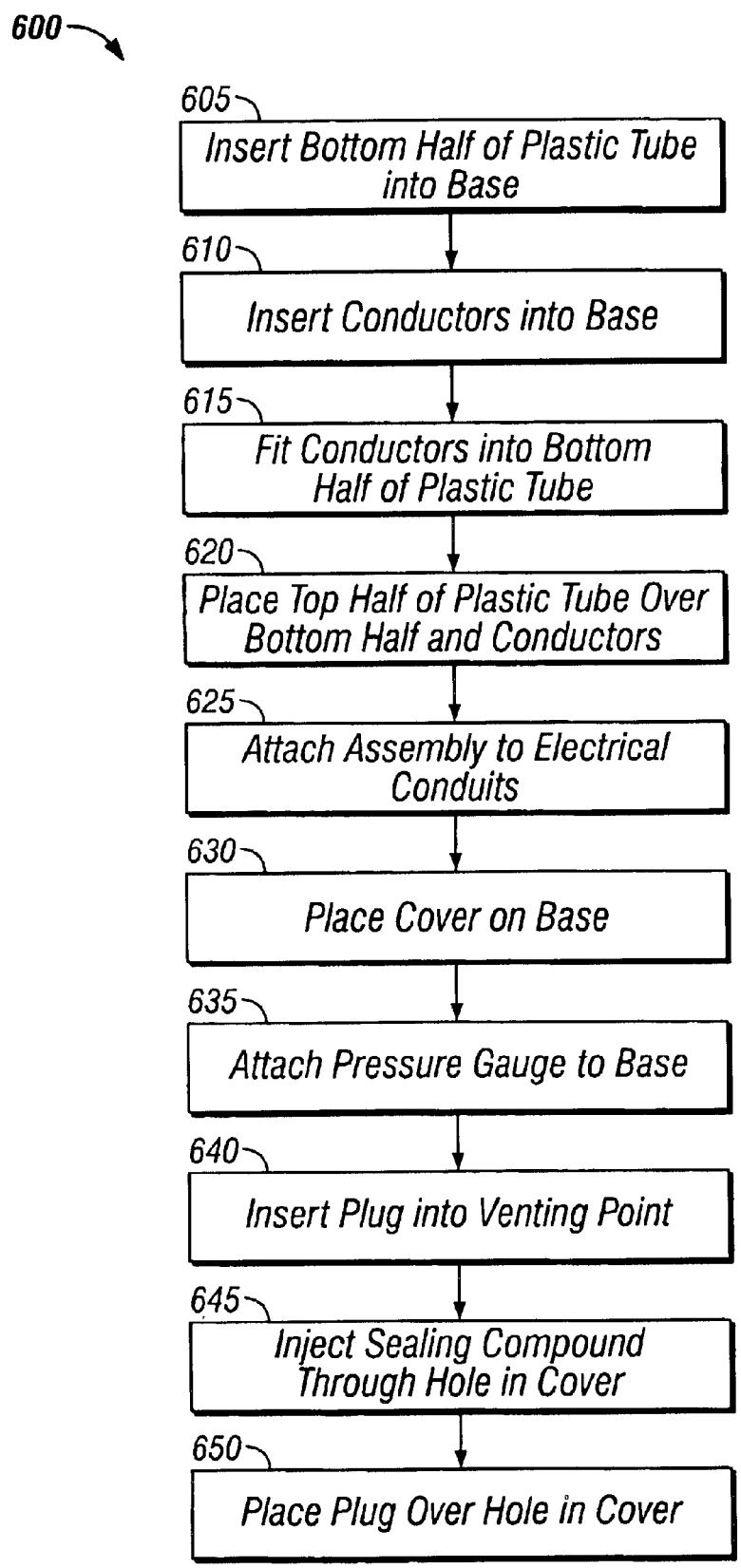
FIG. 6 is a flow chart of a process for assembling a seal.

Referring to FIG. 6, an assembly process 600 is used to put together a seal. The assembly process 600 allows for a quick and simple installation of the seal for protection against leakage of harmful fluids and vapors into electrical conduits. The assembly process 600 first combines the components of a seal and then attaches the seal to the conduits that it is to be sealed.

The first step in the assembly process is inserting the bottom half of the plastic tube into the base of the seal (605). One or more conductors from a conduit to which the seal will be attached are threaded through one of the conduit attachment points in the base and are brought into the center of the base (610). The conductors are fit into the notches in the bottom half of the plastic tube and are taken out of the base through a second conduit attachment point in the base (615).

The top half of the tube then is placed over the bottom half of the tube and the conductors (620). Notches in the top half of the tube line up with notches in the bottom half and fit over the conductors. The top half is snapped together with the bottom half to create the tube. Placing the two halves of the tube together holds the conductors in place within the base and provides a pathway for the vapors to leave the secondary process seal.

To ensure a proper fit, the seal assembly is attached to the electrical conduits through which the conductors run after the plastic tube has been assembled in the base (625). A cover is placed over the base (630). The cover may be screwed onto the base to hold the base and the cover together. A pressure gauge is attached to the base (635). The pressure gauge attaches to one of the venting points on the outside of the base, or it may be placed within the plastic tube. A plug may also be inserted into a venting point to prevent the vapors from exiting the base (640).

A sealing compound is injected into the base through a hole in the cover (645). Immediately after the sealing compound is injected into the base, a plug is placed into the hole in the cover to contain the sealing compound as it expands to fill the inside of the base (650). When expanded and hardened, the sealing compound forms an explosion-proof seal that prevents the migration of vapors down the conduits to which the seal is attached.

A number of implementations have been described. Nevertheless, it will be understood that various modifications may be made. For example, the steps in the described process may be performed in a different order, or the seal may be modified to include only a single venting point. Accordingly, other implementations are within the scope of the following claims.

What is claimed is:

1. A system for sealing electrical conduits and conductors, the system comprising:
    a chamber configured for attachment to a conduit through which at least one conductor runs such that the at least one conductor also runs through the chamber;
    a port that permits access to the chamber to inject a sealing compound into the chamber; and
    a vent that permits access to a portion of the conductor located between portions of the conductor that are surrounded by the sealing compound after the sealing compound is injected into the chamber.

2. The system of claim 1 wherein a pressure gauge that monitors the pressure within the chamber is attached to the vent.

3. The system of claim 1 wherein the vent is blocked with a plug.

4. The system of claim 1 wherein the chamber includes a base and a cover that is threaded to screw onto the base.

5. The system of claim 4 wherein the port is located in the cover.

6. The system of claim 1 wherein the vent includes a tube that separates the portions of the conductor that are surrounded by sealing compound from the portion of the conductor accessible through the vent.

7. The system of claim 6 wherein the at least one conductor runs perpendicularly across the tube.

8. The system of claim 6 wherein the tube includes two interlocking halves between which the at least one conductor is placed.

9. The system of claim 6 wherein the tube is made of plastic.

10. The system of claim 1 wherein the sealing compound is a two-part mixture that expands after mixing and injection into the chamber.

11. A method for sealing electrical conduits and conductors, the method comprising:
    attaching a chamber to a conduit to be sealed, the conduit including at least one conductor running through it;
    mounting a tube that opens to the outside of the chamber within the chamber;
    threading the at least one conductor through the chamber and through the tube;
    covering the chamber with a cover; and
    putting a sealing compound in the chamber.

12. The method of claim 11 further comprising placing a plug over an end of the tube on the outside of the chamber.

13. The method of claim 11 further comprising attaching a pressure gauge to an end of the tube on the outside of the chamber.

14. The method of claim 11 wherein the sealing compound fills the chamber and forms an explosion-proof seal in the chamber.

15. The method of claim 11 wherein mounting the tube in the chamber comprises:
    mounting a bottom half of the tube in the chamber;
    passing the at least one conductor across the bottom half of the tube; and
    mounting a top half of the tube in the chamber over the at least one conductor and the bottom half of the tube.

16. The method of claim 11 wherein covering the chamber with the cover comprises screwing the cover onto the chamber.

17. The method of claim 11 wherein putting the sealing compound in the chamber comprises:
  injecting the sealing compound into the chamber through a nozzle in the cover;
  placing a plug over the nozzle; and
  allowing the sealing compound to expand and harden.

* * * * *